United States Patent [19]

De Forges De Parny et al.

[11] Patent Number: 5,297,654

[45] Date of Patent: Mar. 29, 1994

[54] HELICOPTER-CARRIED NACELLE AND ITS USE PROCESS FOR THE REPLACEMENT OF AN OVERHEAD CABLE PORTION

[75] Inventors: Robert De Forges De Parny, Cadolive; Gérard Moudin, Albertville; Philippe Ruaux, Rognac, all of France

[73] Assignee: Electricite De France Service National, France

[21] Appl. No.: 874,712

[22] Filed: Apr. 27, 1992

[30] Foreign Application Priority Data

Apr. 29, 1991 [FR] France .................... 91 05256

[51] Int. Cl.$^5$ .............................................. E04G 3/10
[52] U.S. Cl. ..................................... 182/150; 182/142
[58] Field of Search .................... 182/150, 142, 10, 11

[56] References Cited

U.S. PATENT DOCUMENTS

| 1,958,877 | 5/1934 | Yake | 182/11 |
| 3,702,124 | 11/1972 | Highland . | |
| 4,488,312 | 10/1984 | Kurtgis . | |

FOREIGN PATENT DOCUMENTS

| 274313 | 11/1988 | Japan | 182/150 |
| 1390677 | 4/1988 | U.S.S.R. | 182/150 |
| 1403175 | | U.S.S.R. | 182/150 |

Primary Examiner—Alvin C. Chin-Shue
Attorney, Agent, or Firm—Pearne, Gordon, McCoy & Granger

[57] ABSTRACT

The invention permits the replacement of a used section of an overhead cable (1) by a new section without depositing said cable on the ground. A nacelle or pod mainly includes a drum (20) onto which is wound the new section to be deposited and on which will be wound the old section to be replaced. The nacelle also includes guide pulleys (14, 16) for the cable (1). The nacelle is suspended on a helicopter by means of a rope, an upper beam (32) and optionally via pyrotechnic means (46) and ball and socket joints (38). It can be completed by jaws (44) for fixing to the cable (1). The invention has application to electric power distribution and transporting cables and to cable railway cables.

14 Claims, 5 Drawing Sheets

HELICOPTER-CARRIED NACELLE AND ITS USE PROCESS FOR THE REPLACEMENT OF AN OVERHEAD CABLE PORTION

FIELD OF THE INVENTION

The invention relates to work on overhead cables, such as those used for the transportation and distribution of high and medium voltage electric power. The invention is also applicable to the cables of transportation means, such as cable railways and other cars carried by cables.

PRIOR ART

All overhead cables, once installed, require numerous repair and maintenance operations. Thus, within the framework of permanent maintenance programs for the power distribution network, Electricité de France must carry out numerous interventions. For example, the repair or replacement of part of a conductive metal cable for carrying high voltage electric power requires the placing of said cable on the ground. The latter operation can only take place from adjacent pylons to the section to be changed and onto which climb one or more fitters. The intervention time is extremely long and the operation is obviously dangerous.

With a view to improving the service provided by the electricity distribution network, it has been necessary to develop new intervention procedures for improving efficiency and speeding up maintenance and repairs on medium and high voltage lines of the public electricity distribution network.

SUMMARY OF THE INVENTION

The first major object of the invention is therefore a helicopter-carried nacelle displaceable along an overhead cable, guided by the said over-head cable and serving to replace an old cable section by a new section. The nacelle is mainly constituted by a metal structure defining a working volume and which carries means for anchoring the nacelle to a helicopter-carried support or raising rope, a drum around which is located the new section for unwinding and around which can be subsequently wound the old section to be replaced and means for guiding the nacelle by the cable.

It is therefore clear that a helicopter-based intervention is much faster and efficient, despite the high hourly costs of using a helicopter. The nacelle is preferably guided by means of two pairs of two pulleys each having an upper pulley, whose groove is slightly open to facilitate the release of the cable when the latter rises against it and a lower pulley for receiving the cable when the nacelle is operational, i.e. when it is pulled upwards by the helicopter.

In order to complete said guidance system, for each pulley pair use is made of a detachable end cover or flange for enclosing the cable between the two lower and upper pulleys, mounted on the same support, the closing of said end cover being ensured by a pin lockable in the support.

To aid the introduction of the cable into the space between the two lower and upper pulleys during the installation of the nacelle, use is made of inclined guide bars placed facing each pair of pulleys.

Preferably, the drum is rotated with the aid of motor means and braking means. The motor means can be constituted by a hydraulic motor operated by an explosion motor or engine. The braking means can be constituted by a manual tape brake.

In order to permit the immobilization of the nacelle along the cable, a pair of jaws is provided on the theoretical cable trajectory.

To ensure that the cable does not enter the nacelle volume defined by the metal structure, lateral arches guiding the cable are placed around the nacelle. This ensures the safety of the operators on the nacelle with respect to the danger constituted by the electric cable relative to which the nacelle can move. To aid the unwinding of the new section to be installed, a guide cage is provided towards the upper part of the drum.

In order to permit the winding around the drum of the section to be replaced, another guide cage is placed alongside the upper part of the drum, so as to define a tangential, rectilinear trajectory with respect to said drum.

In the preferred embodiment of the nacelle, there is an upper beam on which is suspended the nacelle structure. This comprises pyrotechnic jettisoning or release means placed beneath the beam in order to release the nacelle structure if this is absolutely necessary and hooks for the individual securing of the nacelle personnel and the temporary supporting or raising on the upper pulley in the case of the jettisoning of the metal structure should an accident occur.

In this case, the upper bar is connected to the metal structure by ball and socket joints. The nacelle structure preferably has a floor and lateral, retractable catwalks are also provided in order to extend the floor. The nacelle is particularly operational when it has means for controlling the rotation of the drum.

Another main object of the invention is a process for the replacement of an old overhead cable section by a new section. It comprises placing against the overhead cable a helicopter-carried nacelle, like that described hereinbefore and having the tools necessary for the operation, securing the nacelle to the cable, fixing the first free end of the new wound section to the cable drum upstream of the first end of the old section to be replaced, moving the nacelle along the cable and unwinding the new section, fixing a force take-up jack to the second end of the new section and to the cable downstream of the second end of the old section, tensioning the new section by means of the force take-up jack and thereby detensioning the old section, detaching the second end of the old cable section and introducing it into the drum, moving the nacelle in the reverse direction along the cable in order to wind up the old section and detaching from the cable the first end of the old section.

LIST OF DRAWINGS

The detailed description of the invention is accompanied by several drawings, which respectively show.

DETAILED DESCRIPTION OF AN EMBODIMENT OF THE INVENTION

Old Section Replacement Process

Figure 1A:
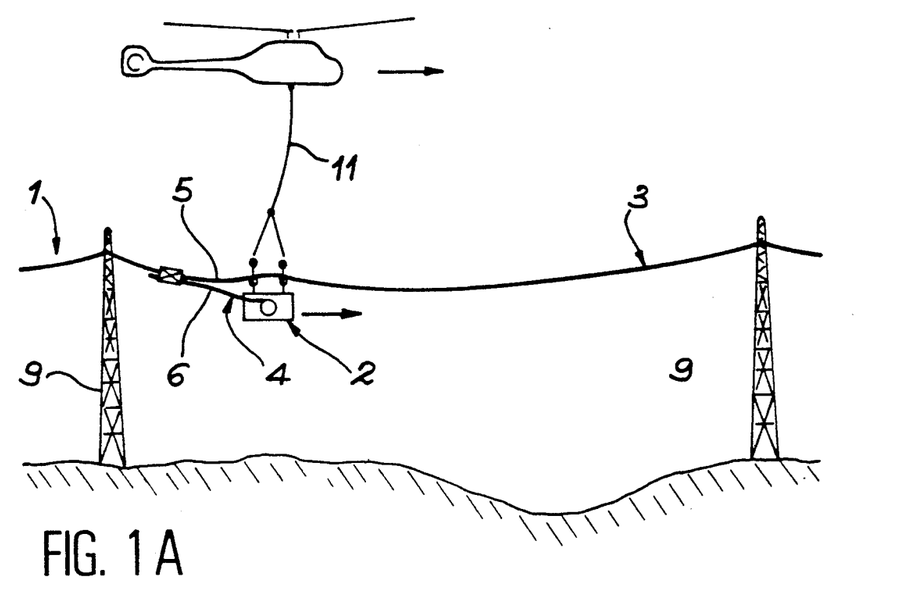
FIGS. 1A, 1B, 1C and 1D: Diagrams relative to the different phases of the process according to the invention.

FIG. 1A shows an overhead cable 1 suspended by pylons 9, such as are the numerous cables of the electric power distribution network. Reference 3 of the cable represents an old section thereof, which is to be replaced, due to any random deterioration or incident. As is immediately clear from the drawings, the process according to the invention uses a helicopter on which is suspended a nacelle, pod or basket 2 by means of a support rope 11. It is therefore possible to unwind a cable or cable portion between two pylons 9. It is here a question of replacing the old section 3 by a new section 4 of the same length.

The first operation consists of suspending a nacelle 2 on the helicopter for placing it against the cable 1 and more specifically against the first end 5 of the old section 3. This nacelle 2 obviously has the new section 4, preferably wound around a drum, so as to be able to unwind the new section 4. This nacelle 2 has also the various fixing and dismantling tools necessary for the operation which is obviously carried out by one or more operators carried by the nacelle. The second operation consists of fixing to the cable 1 the free end 6 of the new section 4 upstream of the end 5 of the old section.

During all these operations, the nacelle 2 is kept at the height of the cable 1 by a helicopter in stationary flight or hovering. For the following operation, the helicopter moves slowly along the cable 1, so as to move the nacelle along the old section 3 and so as to unwind the new section 4 along the old section 3. The guidance of said nacelle 2 is symbolized by four pulleys, which will be described in greater detail hereinafter.

Figure 1B:
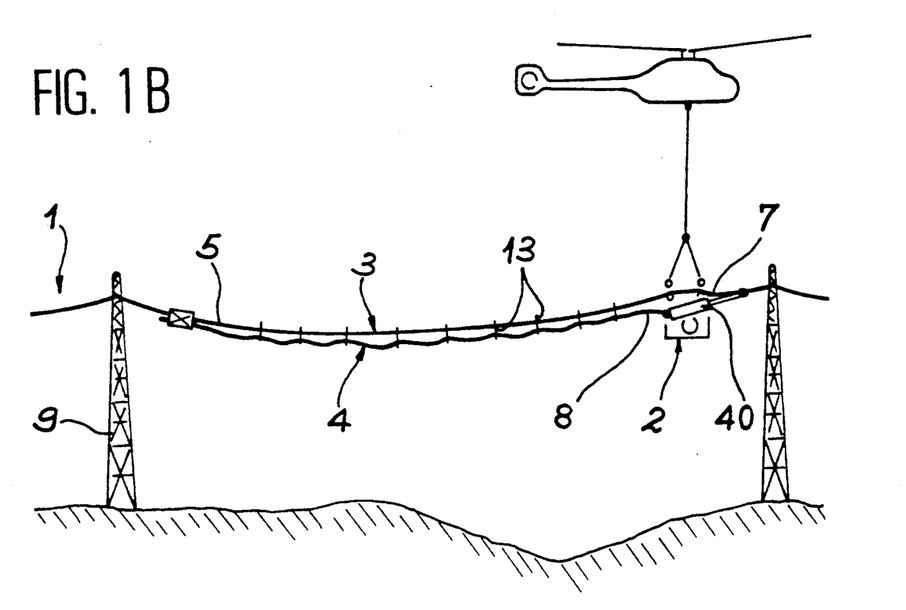

FIG. 1B shows the end of the first helicopter travel, which reaches the second end 7 of the old section 3, the new section 4 being almost entirely unwound from the drum of the nacelle 2. Therefore the following stage consists of fixing to the second end 8 of the new section 4 a force take-up jack 40, whereof the other end is fixed to the cable 1 downstream of the second end 7 of the section to be replace. It should be noted in FIG. 1 that the old section 3 is taut, whereas the new section 4 which has just been unwound is relaxed. In order to facilitate the maintenance of the new section 4 relative to the old section 3, use is preferably made of rings 13, which encircle the two sections 3 and 4.

Figure 3:
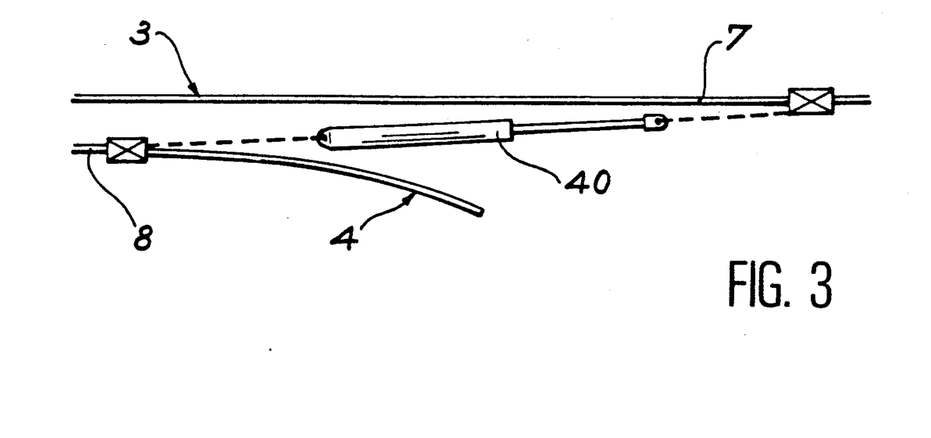
FIG. 3: The use of the force take-up jack in the process according to the invention.

FIG. 3 shows that a part of the second end 8 of the new section 4 must be brought downstream of the jack 40 to be directly fixable to the cable 1.

Figure 1C:
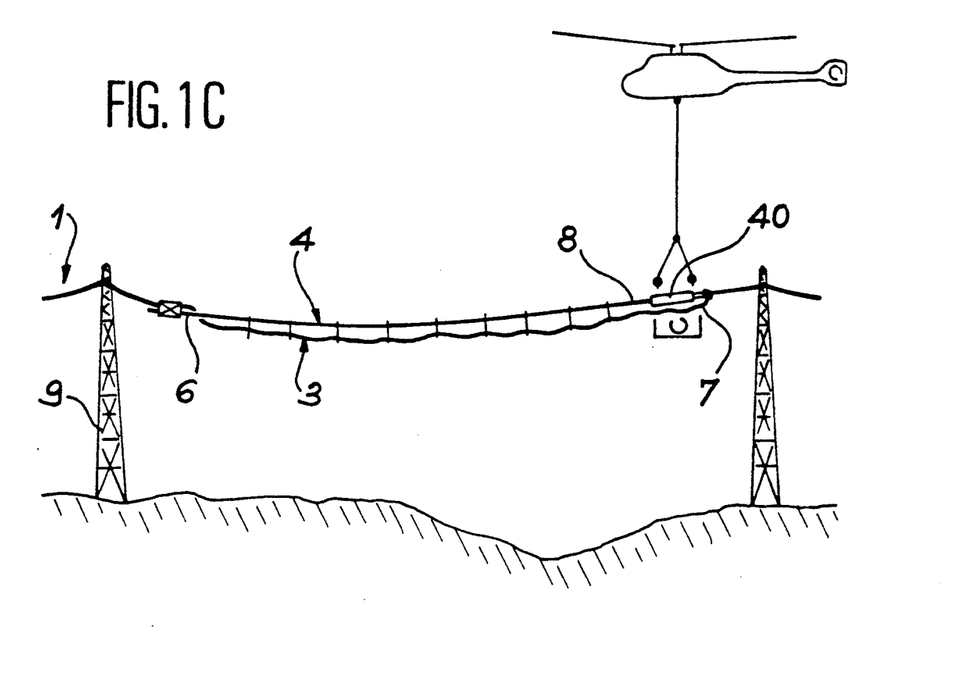

In comparison with FIG. 1C, the new section 4 is shown taut, whereas the old section 3 is shown relaxed. Thus, by means of the force take-up jack 40, the second end 8 of the new section 4 has been moved towards the cable 1 downstream of the second end 7 of the old section 3, thus tensioning the new section 4. As the old section 3 is detensioned, it is possible to detach its end 7 from the cable 1 upstream of the fixing of the force take-up jack 40 to said cable 1. The second end 8 of the new section 4 is fixed to the cable 1.

Figure 1D:
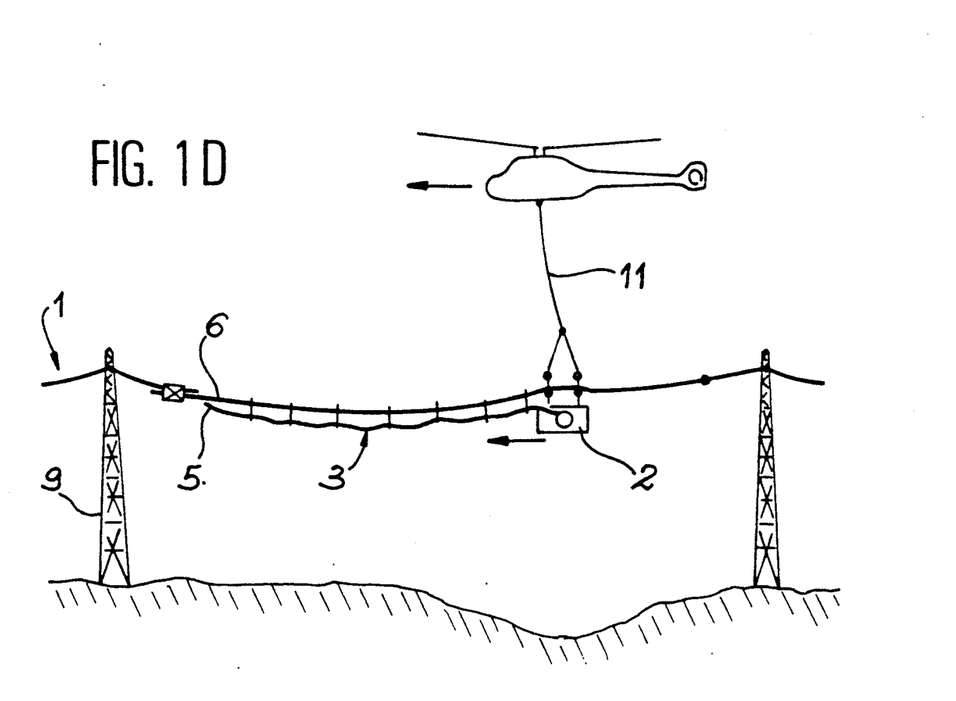

The following phase consists of winding the old section by a reverse displacement of the helicopter on which is suspended the nacelle 2. The rings 13 are removed in gradual manner, as shown by FIG. 1D.

Once the old section 3 has been rewound, the final operation consists of detaching its first end 5 from the cable 1 downstream of the fixing of the first end 6 of the new cable 4. Such an operation can be carried out in a few dozen minutes, so that at a maximum the helicopter is required for one hour. The resulting economies compared with the deposition of a cable on the ground and the retensioning of the new cable, which takes several days, is obvious.

Movable Helicopter-Carried Nacelle

Figure 2:
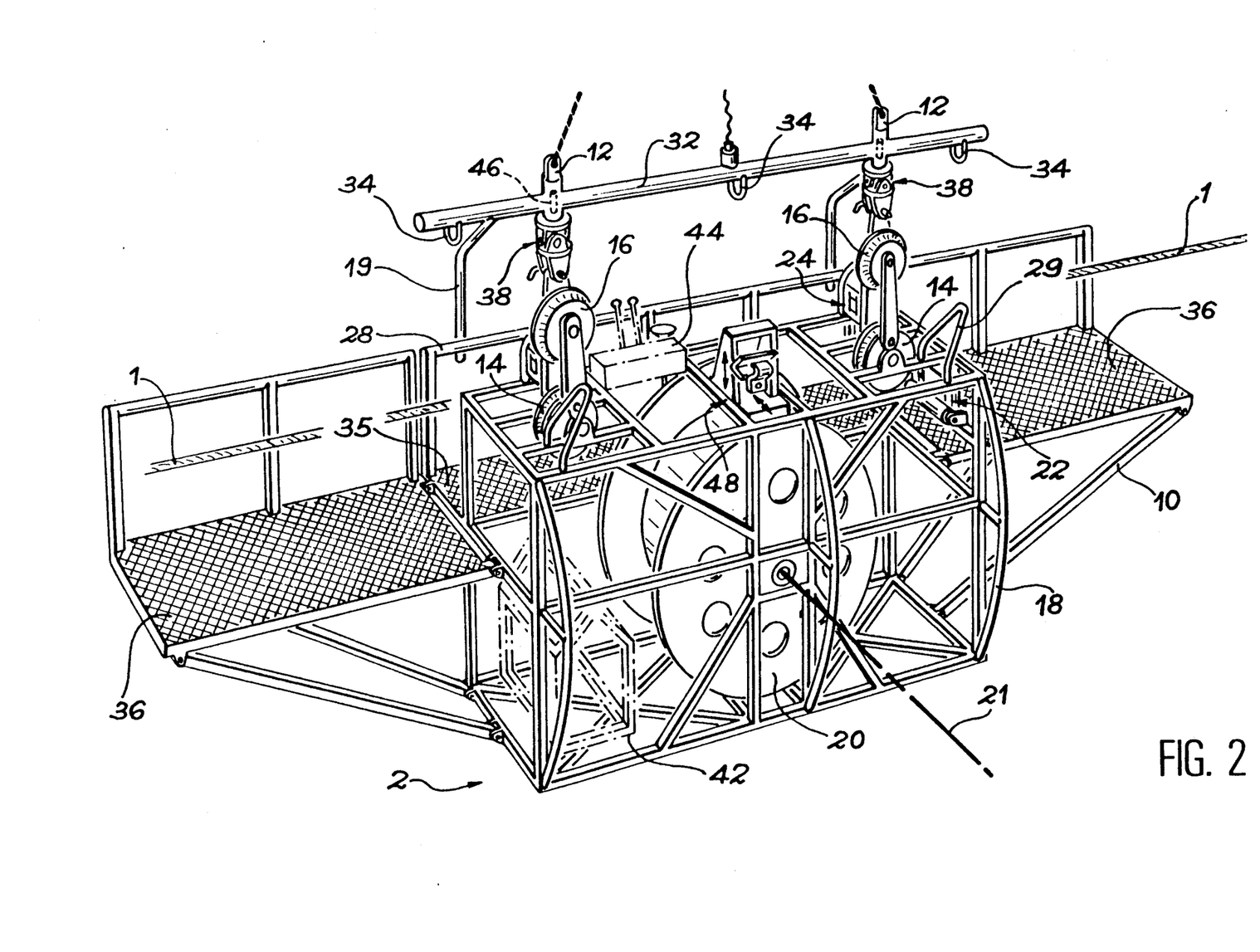
FIG. 2: The nacelle according to the invention.

FIG. 2 is a general diagram of a helicopter-carried nacelle 2 used in the process described hereinbefore. This is only an exemplified embodiment, because it constitutes a prototype and other models can be produced with modifications and various other arrangements. It can immediately be seen that it is mainly constituted by a metal structure 10, constituted by beams, angle members and in preferred manner a floor 35, which is itself constituted by metal sheets or a metal lattice.

Another main element of the nacelle is the anchoring means 12 for fixing to the helicopter rope. These anchoring means can be in the form of several hooks or rings. A third main element is constituted by a drum 20 around which is wound beforehand the new section 4, which is to replace the old section 3. This drum 20 is mounted so as to rotate about a horizontal rotation axis 21.

A final essential element of the nacelle is constituted by its guidance means by the actual cable 1. These guidance means are represented in the drawings by two pairs of pulleys 14 and 16 between which the cable is placed. It should be noted that these sets of pulleys are preferably vertical of the anchoring points 12. Thus, for the duration of the operations, the helicopter exerts a slight vertical tension in such a way that the cable 1 bears on the lower pulley 14. Therefore the latter should be roughly in the same vertical plane as these anchoring points 12.

Figure 4:
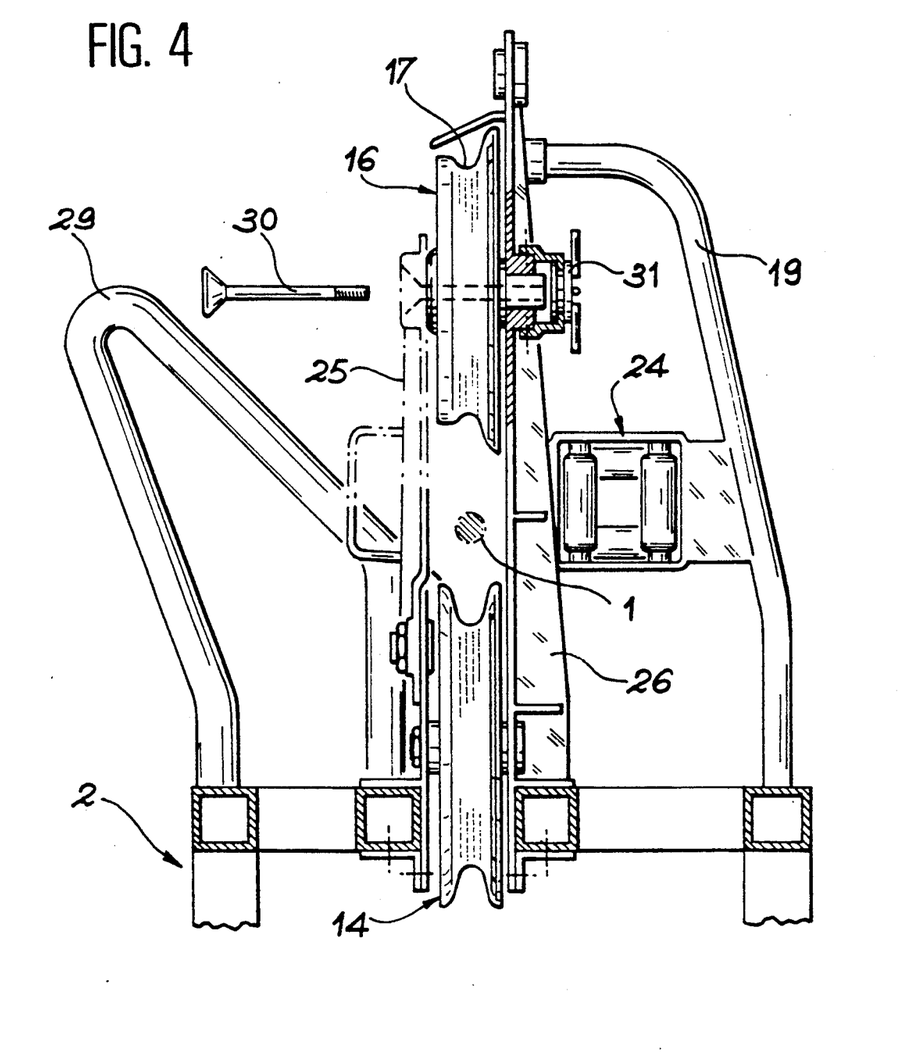
FIG. 4: A front view of a pair of pulleys used in the nacelle according to the invention.

FIG. 4 shows in detail an embodiment of these sets of pulleys. The lower pulley 14 and the upper pulley 16 are installed one above the other and able to rotate freely about two horizontal axes. They are fitted relative to a fixed support 26 integral with the nacelle structure 10.

In FIG. 4, the groove of the lower pulley 14 has a symmetrical shape adopting the diameter of the cable 1. The shape of the groove section 17 of the upper pulley 16 is asymmetrical. More precisely, the left-hand side or hub has been retracted. Thus, when the nacelle is operational, the cable 1 bears against the lower pulley 14 in its groove. When it is a question of releasing the nacelle from the cable 1, the helicopter drops slightly and the cable 1 leaves the groove of the lower pulley and bears against the groove 17 of the upper pulley 16. It is then necessary to be able to free the cable 1. To this end, the groove 17 does not have as precise a shape with respect to the cable 1 as that of the lower pulley 14. A slight lateral pressure on the cable 1 makes it possible to remove the latter from the groove 17 of the upper pulley 16.

In association with each pair of pulleys, there are guide bars 29 for enabling the cables 1 to penetrate the space between the two upper and lower pulleys 16, 14 respectively. As shown in FIG. 4, the active part of said guide bars 29 has a portion, inclined in the case of FIG. 4 by 45°, for channelling the cable 1 towards the two pulleys 14 and 16. Thus, during the nacelle approach operation, the nacelle moves closer and closer to the cable. Bearing in mind the length of the helicopter support rope of approximately 30 meters, the accuracy of this operation is not vital. Therefore the movements of the nacelle relative to the cables persist. It is therefore necessary to channel this cable in the direction of the space between the two pulleys 14 and 16.

During the approach manoeuvre, when the cable is above the inclined part of the guide bar 29, the helicopter pulls the nacelle 2 upwards and the cable 1 is deflected into the space between the two pulleys 14 and 16. Once positioned, the cable is preferably enclosed in this space by means of a flange or end cover 25 positioned facing each pair of pulleys 14 and 16.

In FIG. 4, the end cover 25 is shown in mixed line form in its closed position. It is then vertical and passes through the two horizontal axes of the two pulleys 14 and 16. The closing of the space between said end cover 25, the support 26 and the lower and upper pulleys 14, 16 is ensured by a pin 30. The locking of the pin 30 in the securing position can be ensured by a screw locking system 31.

With respect to the guidance of the cable 1, as shown in FIGS. 2 and 4, it is advantageous to have lateral guidance arches 18, 19 on either side of the volume defined by the structure 10 of the nacelle 2 on which move the operators. Thus, during the approach of the nacelle 2, it is important that any rocking movements of the nacelle 2 do not lead to injury risks for the operators as a result of an excessively violent approach of the cable 1 to the nacelle 2. In FIG. 2, the lateral arches 18 are curved to ensure that the cable 1 does not excessively approach the metal structure and in particular the drum 20. In FIG. 4 it can be seen that the other arches 19 have a shape intended to protect the top of the body of the operators working on the nacelle floor 35. FIG. 2 better shows the lower base of said lateral arches 19 fixed to a member 28 positioned vertically of the edge of the floor 35. It is also useful to provide a small protective screen 33 above the groove 17 of the upper pulley 16 so that the cable is not inserted in untimely manner in said groove 17 during the approach of the nacelle.

It is advantageous for the drum 20 to be operated by motor means during the rewinding of the used section. It is also preferable for it to be equipped with braking means during the unwinding of the new section. Consequently and as shown in FIG. 2, there is a location 42 within which can be placed an explosion motor in order to supply the energy necessary for rotating the drum 20. For this purpose use can be made of a hydraulic motor for rotating the drum 20 at a very reduced speed. The braking means can be constituted by a tape brake acting on a diameter of the drum 20 and which is manually controlled. For the manipulation of these motor means and these braking means, it is possible to have control means 44 arranged ergonomically with respect to the floor 35 on which the operators move. In FIGS. 2 and 4 it is possible to see a first guidance cage 24 placed in a horizontal plane, which is roughly tangential to the upper part of the drum 20. Under these conditions, the new section wound around the drum 20 can easily be unwound, whilst being guided by the guidance cage 24. The later is preferable constituted by two pairs of parallel rollers angularly displaced by 90°.

There is also a second guidance cage 22 placed roughly in the same horizontal plane and which is used for guiding the used cable during its rewinding. As shown in FIG. 2, said second cage 22 precisely faces the drum 20 with respect to the optimum trajectory to be taken by a cable to be wound around the drum 20. Thus, bearing in mind tensions during said rewinding, it is important that a used cable to be wound up performs the maximum rectilinear trajectory.

During operations to be carried out at the ends of two sections of cables, the nacelle 2 must be stationary. For this purpose there are means for securing the nacelle 2 with respect to the cable 1. As shown in FIG. 2, such a securing action can be brought about with the aid of a pair of jaws 4B temporarily locking the cable 1. In this case the pair of jaws 4B is positioned above the drum 20 between the two pairs of lower and upper pulleys 14, 16. The closing of the jaws 4B gives a gripping action on the cable 1 and therefore immobilizes the nacelle 2 in horizontal translation.

Figure 5:
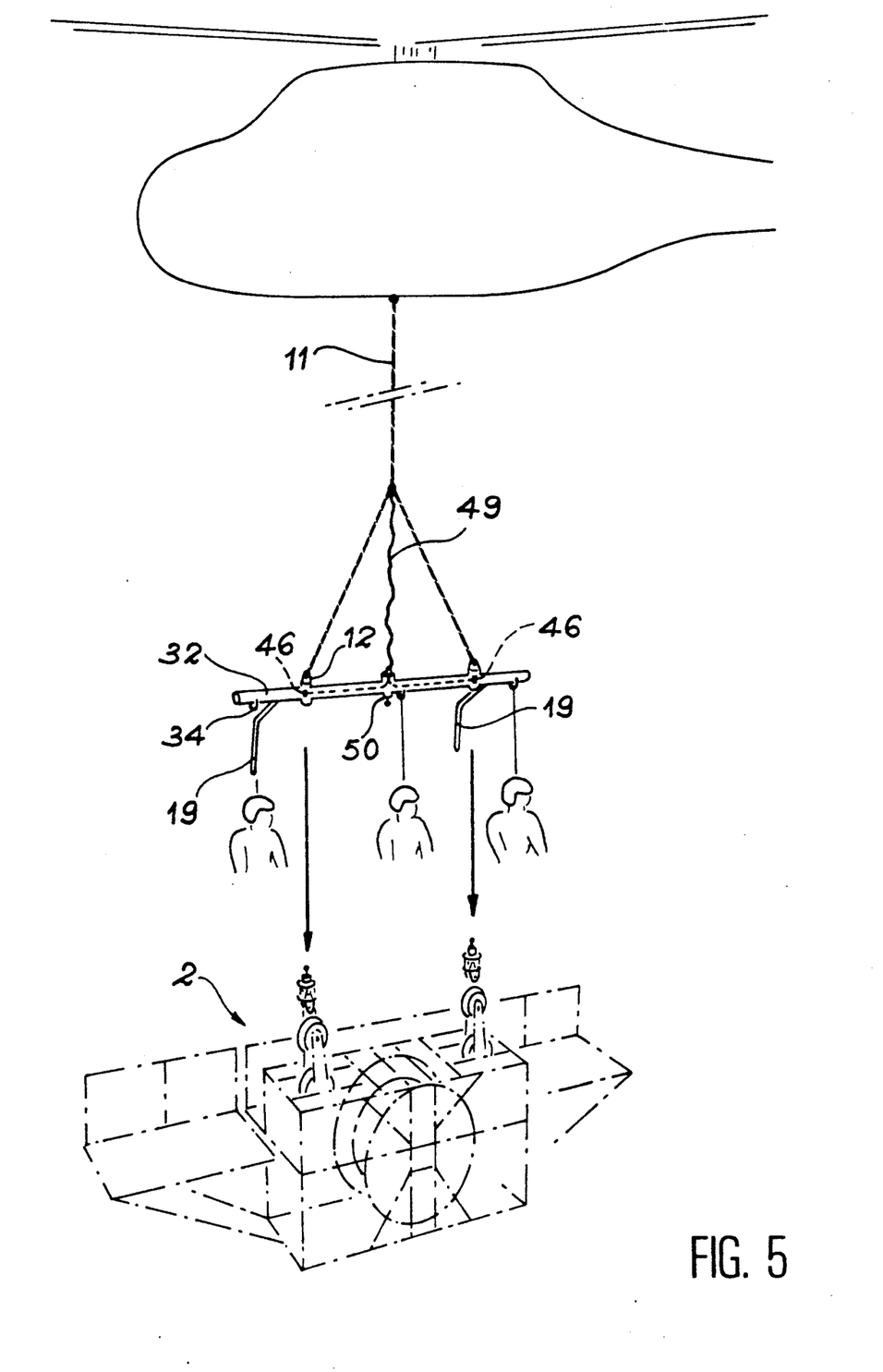
FIG. 5: The process of jettisoning the metal structure according to the invention.

As illustrated in FIG. 5, the safety standards imposed for this type of work on overhead cables using a helicopter-carries nacelle, make it necessary for the latter to be jettisonable at any time in the case of a failure of the support helicopter. For this purpose there is an upper bar 32 on which are fixed the anchoring means 12. On said upper bar 32 is suspended the metal structure 10 of the nacelle 2. There are pyrotechnic jettisoning means 46, which can be pyrotechnically initiated by operators in the case of an accident by means of a control button.

A control cord 49 can even initiate such a separation from the helicopter. The operation of the pyrotechnic means leads to the breaking of the structure 10 relative to the upper bar 32 and the dropping of all the equipment. The pyrotechnic means can be constituted by explosive bolts.

In the case of such an incident, safety hooks 34 are provided on the upper bar 32, with a view to securing each operator to one of the hooks 34 should the metal structure 10 drop. In this case, each operator would be suspended on the upper bar 32.

To maintain a good positioning of the structure 10 relative to the cable, it is advantageous to place below the upper bar 32 and at the top of the metal structure 10 ball and socket joints 38 for giving the structure 10 independent movements with respect to those of the bar 38.

FIG. 2 also shows the lateral catwalks 36 opened out on either side of the metal structure 10 in the extension of the floor 35. It is clear that these lateral catwalks 36 extend the field of operation of the operators on board the nacelle.

Among the advantages provided by the invention is that in the case of a repair to an electric cable, the electric line can remain live during the replacement of the old section by the new one. Another advantage consists of avoiding the cutting down of numerous trees positioned below the cable to be replaced, when the latter is in a forested or wooded area. In the same fauna and flora can be preserved.

The invention makes it possible to repair any random line, no matter how difficult the access. It is pointed out that an operation which can last several days without a helicopter-borne nacelle can take place in the case of helicopter use in hardly an hour.

The invention is also applicable to the repair and maintenance of cable railway cables and various transportation systems of similar types used in mountain skiing areas.

We claim:

1. Helicopter-carried nacelle (2) movable along an overhead cable (1) and guided by the latter, intended for the replacement of an old section (3) of said cable (1)

by a new section of cable (4) comprising a metal structure (10) defining a working volume, which carries anchoring means (12) for fixing the nacelle (2) to a helicopter support rope (11), a drum (20) around which can be wound and unwound the new section (4) and around which can be wound subsequently the old section (3) to be replaced and means for guiding the nacelle (2) by the cable (1), the guidance means comprising two pairs of pulleys, each pair comprising an upper pulley (16), having a groove (17) defined by a pair of flanges, whereby one of said flanges having a diameter that is less than a diameter of the other of said flanges, to facilitate release of the cable of the cable (1) when the latter rises against it at the end of operations carried out by means of the nacelle (2) and a lower pulley (14) for receiving the cable (1), when the nacelle (2) is operational, i.e. when it is pulled up by the helicopter.

2. Nacelle according to claim 1, characterized in that it comprises means for controlling the rotation of the drum (20).

3. Nacelle (2) according to claim 1, characterized in that each pair of pulleys has a detachable end cover (25) for enclosing the cable (1) between the two pulleys (14, 16) mounted on a support (26), closure being ensured by a pin (30) lockable in said support (26).

4. Nacelle (2) according to one of the claims 1 or 3, characterized in that guide bars (29) are located facing each pair of pulleys (14, 16) inclined in order to guide the cable (1) in the space between the two pulleys (14, 16) during the placement of the nacelle (2).

5. Nacelle (2) according to claim 1, characterized in that it has motor rotation means and braking means for the drum (20).

6. Nacelle (2) according to claim 5, characterized in that the motor means are constituted by a hydraulic motor operated by an explosion motor and the braking means are constituted by a manual tape brake.

7. Nacelle (2) according to claim 1, characterized in that it comprises a pair of jaws (44) placed on a theoretical trajectory of the cable (1) to immobilize the nacelle (2) in horizontal translation on said cable (1).

8. Nacelle (2) according to claim 1, characterized in that it comprises lateral guidance arches (18, 19) for the cable (1) about the nacelle (2) in order to avoid the later entering a volume defined by the nacelle (2).

9. Nacelle (2) according to claim 1, characterized in that it comprises a first guidance cage (24) for the new section (4) installed and positioned towards the upper part of the drum (20).

10. Nacelle according to claim 1, characterized in that it comprises a second guidance cage (22), placed alongside an upper part of the drum (20), so as to define a tangential, rectilinear trajectory with respect to the drum (20) for the old section (3) to be replaced, which old section is to be wound around the drum (20).

11. Nacelle (2) according to claim 1, characterized in that it comprises an upper beam (32) on which is suspended the structure (10) of the nacelle (2), pyrotechnic jettisoning means (46) below the upper beam (32) for jettisoning the structure (10) of the nacelle (2) in the case of an accident and hooks (34) for the individual securing of personnel and temporary supporting of the upper beam (32) in the case of the jettisoning of the structure (10).

12. Nacelle (2) according to claim 11, characterized in that the upper beam (32) is connected to the structure (10) by ball and socket joints (38).

13. Nacelle (2) according to claim 1, characterized in that the structure (10) comprises a floor (35), retractable lateral catwalks (36) being provided for extending the floor (35) of the structure (10).

14. Process for the replacement of an old section (3) of an overhead cable (1) by a new section (4) consisting of placing against the cable (1) a helicopter-carried nacelle (2) having a structure fixable to a helicopter support, a drum around which cable can be wound and unwound and means for guiding the nacelle for movement along the cable, securing the nacelle (2) on the cable (1), fixing a first free end (6) of the new wound section (4) to the overhead cable (1) upstream of the first end (5) of the old section (3), moving the nacelle (2) along the cable (1) and unwinding the new section (4), fixing a force take-up jack (40) to the second end (8) of the new section (4) and to the cable (1) downstream of the second end (7) of the old section (3), tensioning the new section (4) by means of the force take-up jack (40), fixing the second end (8) of the new section (4) to the cable (1), thereby releasing tension of the old section (3), detaching from the overhead cable the second end of the old section (3) and attaching it to the drum (20), moving the nacelle (2) in the reverse direction along the cable (1) for winding up the old section (3) and detaching from the cable (1) the first end (5) of the old section (3).

* * * * *

UNITED STATES PATENT AND TRADEMARK OFFICE
CERTIFICATE OF CORRECTION

PATENT NO. : 5,297,654

DATED : March 29, 1994

INVENTOR(S) : Robert De Forges De Parny et al.

It is certified that error appears in the above-identified patent and that said Letters Patent is hereby corrected as shown below:

Column 6, lines 17 and 18, delete "helicopter-carries" and insert --helicopter-carried--.

Column 7, line 13, (Claim 1, line 16), delete "of the cable" (second occurrence).

line 30, (Claim 4, line 5), delete "the" (first occurrence).

Signed and Sealed this

Sixteenth Day of August, 1994

*Attest:*

BRUCE LEHMAN

*Attesting Officer*  *Commissioner of Patents and Trademarks*